Patented Jan. 29, 1952

UNITED STATES PATENT OFFICE 2,583,744

ESTERS OF THIOPHOSPHORIC ACID

Gerhard Schrader, Opladen-Bruchhausen, and Hans Kükenthal, Leverkusen-Bayerwerk, Germany, assignors to Farbenfabriken Bayer, Leverkusen, Germany No Drawing. Application March 26, 1949, Serial No. 83,782. In Switzerland April 5, 1948

8 Claims. (Cl. 260—344.6)

The present invention relates to new esters of thiophosphoric acid and to their manufacture. More particularly the invention relates to dialkyl thiophosphoric esters of the hydroxycoumarins. These esters show very valuable pesticidal properties; therefore another object of this invention are pesticidal compositions comprising as active ingredients these esters.

The new thiophosphoric esters correspond to the general formula:

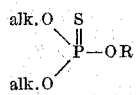

In this formula the radicals alk stand for lower alkyl groups, and R stands for the radical of a coumarin. The alkyl radicals may be the same or different; by way of example methyl, ethyl, propyl, butyl may be mentioned. The coumarin radicals can be substituted in the 4- or 3-position by a lower alkyl, preferably by methyl.

The new compounds are obtainable in known manner by reacting a dialkyl thiophosphoryl chloride with a hydroxy-coumarin in the presence of an acid binding agent such as soda ash, calcium carbonate, sodium cyanide, pyridine and others. The reaction is preferably carried out in an indifferent solvent such as benzene or chlorobenzene. As hydroxy-coumarins may be mentioned 6-hydroxy-coumarin, 7-hydroxy-coumarin, 6-hydroxy-4-methyl-coumarin, 7-hydroxy-4-methyl-coumarin, 6-hydroxy-3-methyl-coumarin, 7-hydroxy-3-methyl-coumarin. The new compounds are oily or crystallized substances. Dissolved in suitable solvents, emulsified or dispersed in water, mixed with the ordinary solid carriers such as talcum, diatomaceous earth, clay, and the like with or without the admixture of spreaders and stickers, the new esters can be applied in the form of solutions, emulsions, dispersions, dusts in a manner known to the art as powerful pesticidal compositions. These compositions will kill moth larvae and other textile pests, and textiles treated with them will be protected against these pests. The compositions are further very effective against bugs, lice, aphides, roaches, and particularly effective against the Colorado beetle and its larvae. Another advantage of these compositions is their relatively low toxicity towards warm-blooded animals.

The invention is illustrated by the following examples; it is, however, not limited thereto.

Example 1

Woolen material is impregnated by means of an aqueous emulsion with ¼% of its weight of dimethyl thiophosphoric acid ester of 7-hydroxy-4-methyl-coumarin (M. P. 77° C.). The material is dried on air. Moth larvae put on the material treated in this manner will be killed after a few hours.

Example 2

Bed bugs put on the material treated according to Example 1 are severely ill after 24 hours and dead after 72 hours.

Example 3

Talcum is impregnated with 0.5% of the diethyl thiophosphoric acid ester of 4-methyl-7-hydroxy-coumarin (M. P. 38° C.). On dusting this powder over potato plants which are infested with Colorado beetle larvae, all larvae are killed to 100% after a short time. The outgrown Colorado beetles are likewise killed to 100% with this dust.

The same exterminating action on Colorado beetle larvae and Colorado beetles is obtained with a 0.5% dust containing one of the following active substances: dimethyl thiophosphoric acid ester of 7-hydroxy-4-methyl-coumarin, diethyl-thiophosphoric acid ester of 7-hydroxy-coumarin (M. P. 46° C.), dimethyl thiophosphoric acid ester of 6-hydroxy-4-methyl-coumarin (viscous oil), diethyl thiophosphoric acid ester of 6-hydroxy-4-methyl-coumarin (viscous oil).

Example 4

60 parts of diethyl thiophosphoric acid ester of the 7-hydroxy-4-methyl-coumarin are mixed with 40 parts of an emulsifying agent (reaction product of 4-hydroxy diphenyl with 6 mols of ethylene oxide). A 0.1% aqueous solution prepared from this mixture is sprayed on potato plants infested with Colorado beetles and larvae. After 4 hours all larvae and beetles are killed. Similar good results on Colorado beetles and larvae are obtained with the following active substances: dimethyl thiophosphoric acid ester of 7-hydroxy-4-methyl-coumarin, diethyl thiophosphoric acid ester of 7-hydroxy-coumarin.

Example 5

As in Example 4, 60 parts of diethyl thiophosphoric acid ester of 7-hydroxy-4-methyl-coumarin are mixed with 40 parts of an emulsifying agent (reaction product of dodecyl alcohol with 6 mols of ethylene oxide). A 0.1% aqueous solution of this mixture is sprayed on plants which are infested with aphides. After 4-6 hours all aphides are killed.

Example 6

Saw dust is impregnated with 5% of diethyl thiophosphoric acid ester of 7-hydroxy-4-methyl-coumarin. This dust is strewn on a floor covered with cockroaches. After a few hours the cockroaches are severely ill. After 24 hours all roaches are killed.

Ants are killed entirely already after 15 hours under these conditions.

*Example 7*

Cotton material is impregnated by means of an aqueous emulsion with ¼% of its weight of diethyl thiophosphoric acid ester of 7-hydroxy-4-methyl-coumarin. The material is dried. 10 lice are put on the material thus treated. After a few hours the lice are severely ill. After 10 hours all lice are dead.

We claim:

1. Esters of the general formula:

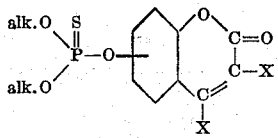

wherein alk stand for lower alkyl radicals, and X for one of the group consisting of hydrogen and lower alkyl, being oily to crystallized substances of powerful pesticidal properties.

2. Esters of the general formula:

alk.O\\S
   P—O—[ring]—O—C=O, CH, CH wherein alk stand for lower alkyl radicals, being oily to crystallized substances of powerful pesticidal properties.

3. Esters of the general formula:

alk.O\\S
   P—O—[ring]—O—C=O, CH, C—CH₃ wherein alk stand for lower alkyl radicals, being oily to crystallized substances of powerful pesticidal properties.

4. The ester of the formula:

CH₃O\\S
   P—O—[ring]—O—C=O, CH, C—CH₃ being a crystallized substance melting at 77° C.

5. The ester of the formula:

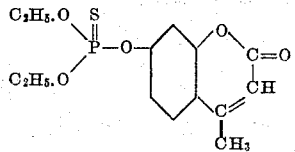

being a crystallized substance melting at 38° C.

6. The ester of the formula:

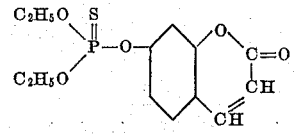

being a crystalline compound melting at 46° C.

7. The ester of the formula:

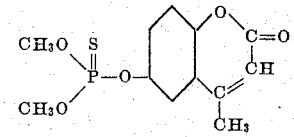

being a viscous oil.

8. The ester of the formula:

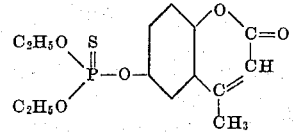

being a viscous oil.

GERHARD SCHRADER.
HANS KÜKENTHAL.

REFERENCES CITED

The following references are of record in the file of this patent:

UNITED STATES PATENTS

| Number | Name | Date |
|---|---|---|
| 1,995,247 | Haring | Mar. 19, 1935 |

OTHER REFERENCES

Ser. No. 188,058, Dorr et al. (A. P. C.), published June 15, 1943 (abandoned).

Mfg. Chem. and Perfumer, December 1948, XIX, 12, pages 548–549.